US012789327B2

(12) United States Patent
Zhan

(10) Patent No.: US 12,789,327 B2
(45) Date of Patent: Nov. 10, 2026

(54) RATCHET WRENCH

(71) Applicant: Ying-Chun Zhan, Longyou County (CN)

(72) Inventor: Ying-Chun Zhan, Longyou County (CN)

( * ) Notice: Subject to any disclaimer, the term of this patent is extended or adjusted under 35 U.S.C. 154(b) by 307 days.

(21) Appl. No.: 18/605,616

(22) Filed: Mar. 14, 2024

(65) Prior Publication Data

US 2025/0289098 A1 Sep. 18, 2025

(51) Int. Cl.
*B25B 13/46* (2006.01)

(52) U.S. Cl.
CPC .................................. *B25B 13/463* (2013.01)

(58) Field of Classification Search
CPC ............................ B25B 13/463; B25B 13/467
USPC ..................................................... 81/60–63.2
See application file for complete search history.

(56) References Cited

U.S. PATENT DOCUMENTS 5,636,557 A * 6/1997 Ma ........................ B25B 13/462 81/60
6,260,449 B1 * 7/2001 I-He ...................... B25B 13/463 81/63
6,708,586 B1 * 3/2004 Chen ..................... B25B 13/463 81/63
6,862,955 B1 3/2005 Shu-Sui et al.
7,100,477 B2 * 9/2006 Lee ....................... B25B 13/463 81/58
8,104,381 B1 * 1/2012 Chen ..................... B25B 13/463 81/63.2
2004/0149087 A1 * 8/2004 Hsien .................... B25B 13/463 81/60

* cited by examiner

*Primary Examiner* — Hadi Shakeri
(74) *Attorney, Agent, or Firm* — Justin Lampel

(57) ABSTRACT

A ratchet wrench includes a wrench body, a ratchet wheel, a mounting member, a pawl member, an elastic member, and a first snap ring. The wrench body has a first resting face and a second resting face. The ratchet wheel has a ratchet portion, a first annular groove, and a rotation portion. The mounting member has a receiving portion, a first restriction section, and a second restriction section. The pawl member has an engaging portion. The elastic member is biased between the mounting member and the pawl member. The first snap ring is snapped into the first annular groove. The rotation portion rests on the first resting face, and the first snap ring rests on the second resting face, so that the ratchet wheel, the mounting member, and the pawl member are limited by the rotation portion and the first snap ring.

17 Claims, 11 Drawing Sheets

RATCHET WRENCH

BACKGROUND OF THE INVENTION

Field of the Invention

The present invention relates to a hand tool and, more particularly, to a ratchet wrench.

Description of the Related Art

A conventional ratchet wrench was disclosed in the U.S. Pat. No. 6,862,955, and comprises a wrench body or handle 20, a positioning mechanism 30, a pawl element 40, a ratchet wheel mechanism 50, and a ring member 60. The wrench body 20 is provided with a first groove 21 and an internal crescent cavity 22. The positioning mechanism 30 is mounted in the first groove 21 and the internal crescent cavity 22 of the wrench body 20 and includes a tab 33 and a spring 34 mounted on the tab 33. The pawl element 40 is mounted in the internal crescent cavity 22 of the wrench body 20 and provided with a pawl section 41 and a bent portion 42. The bent portion 42 pushes the spring 34. The ratchet wheel mechanism 50 is mounted in the first groove 21 of the wrench body 20 and has a central opening 51. The ratchet wheel mechanism 50 meshes with the pawl section 41 of the pawl element 40. The ring member 60 is mounted on the wrench body 20 and restricts the ratchet wheel mechanism 50 to prevent the ratchet wheel mechanism 50 from being detached from the wrench body 20.

However, the conventional ratchet wrench has the following disadvantages.

1. The internal crescent cavity 22 of the wrench body 20 has two closed ends so that it is necessary to use an expensive T-shaped cutter for working the internal crescent cavity 22, thereby increasing the working cost. After the T-shaped cutter enters the first groove 21 of the wrench body 20, the T-shaped cutter is moved toward the internal crescent cavity 22 to perform a successive cutting. Finally, the T-shaped cutter rests on an inner peripheral face of the first groove 21. In such a manner, the T-shaped cutter has a blade for cutting and forming the internal crescent cavity 22 and has a shank limited by the inner peripheral face of the first groove 21. Thus, if the diameter of the shank of the T-shaped cutter is too large, the shank of the T-shaped cutter is easily broken due to an excessive force during the working process, thereby wearing and failing the T-shaped cutter.
2. The first groove 21 has a bottom provided with an abutting edge so that the first groove 21 has a stepped shape with a larger diameter and a smaller diameter. Thus, when a drill with a larger diameter is used to drill the first groove 21, it is necessary to consider the travel of the drill for working the larger diameter of the first groove 21, thereby increasing the working time and labor.
3. The inner peripheral face of the first groove 21 of the wrench body 20 is worked to form a second groove 24. When the diameter of the first groove 21 is more than 15 mm, it is easy to cut the second groove 24 by turning, but when the diameter of the first groove 21 is less than 12 mm, it is difficult to cut the second groove 24 by turning, thereby wasting the manual labor.

BRIEF SUMMARY OF THE INVENTION

In accordance with the present invention, there is provided a ratchet wrench comprising a wrench body, a ratchet wheel, a mounting member, a pawl member, an elastic member, and a first snap ring. The wrench body is provided with a first receiving recess, a second receiving recess, a first resting face, a second resting face, a first arcuate face, and a second arcuate face. The ratchet wheel is provided with a ratchet portion, a mounting portion, a first pivot portion, a first annular groove, a second pivot portion, and a rotation portion. The mounting member is provided with a receiving portion, a first restriction section, a second restriction section, a first spring biased section, a third arcuate face, and a fourth arcuate face. The pawl member is provided with an engaging portion and a second spring biased section. The elastic member is elastically biased between the mounting member and the pawl member. The first snap ring is snapped into the first annular groove. The rotation portion rests on the first resting face, and the first snap ring rests on the second resting face, so that the ratchet wheel, the mounting member, and the pawl member are limited by the rotation portion and the first snap ring.

According to the primary advantages of the present invention, the rotation portion rests on the first resting face, and the first snap ring rests on the second resting face and is retained in the first annular groove, so that the ratchet wheel, the mounting member, the pawl member, and the elastic member are received in the wrench body, to finish assembly of the ratchet wrench. Thus, the first snap ring facilitates assembly of the ratchet wrench.

According to another advantage of the present invention, the rotation portion rests on the first resting face, and the first snap ring rests on the second resting face, so that the ratchet wheel is limited by the rotation portion and the first snap ring and is pivotally mounted in the first receiving recess. The mounting member and the pawl member are limited by the rotation portion and the first snap ring and will not be detached from the second receiving recess. Thus, the rotation portion and the first snap ring restrict the ratchet wheel, the mounting member, the pawl member, and the elastic member, to prevent the ratchet wheel, the mounting member, the pawl member, and the elastic member from being detached from the wrench body.

According to a further advantage of the present invention, the first receiving recess penetrates the wrench body, and the second receiving recess also penetrates the wrench body. Thus, when the cutting tool is used to work the first receiving recess and the second receiving recess, it is unnecessary to control the working depth of the cutting tool, thereby facilitating the efficiency for working the wrench body.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
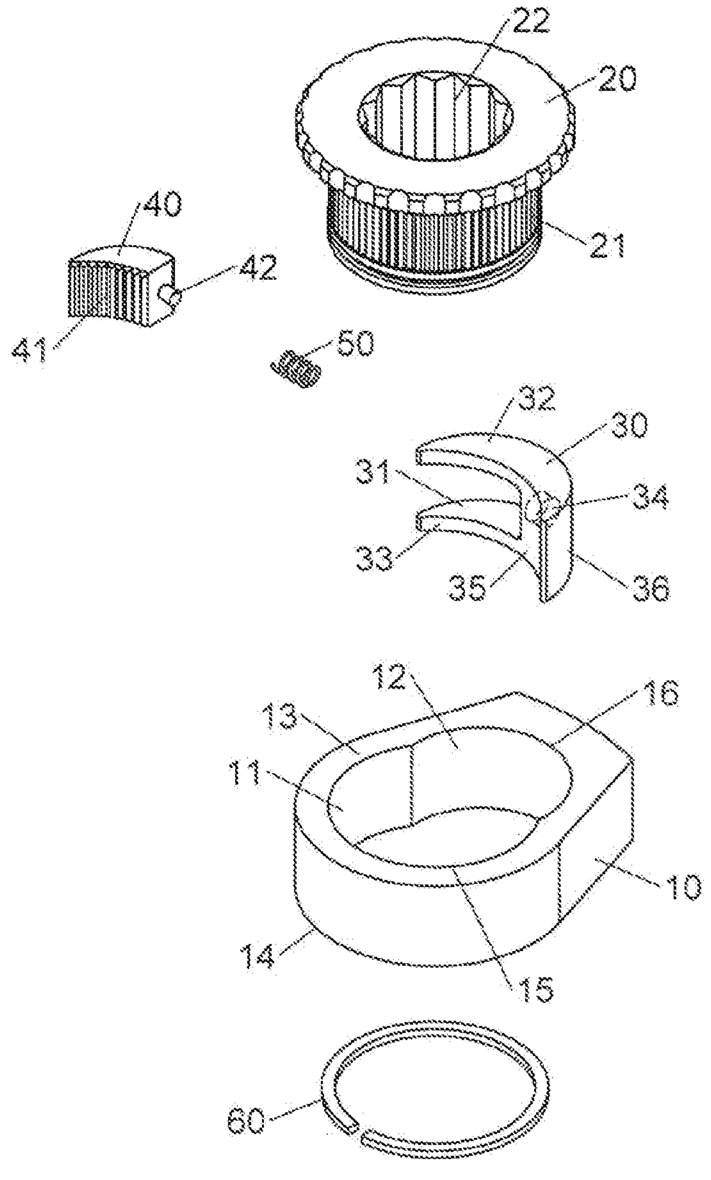
FIG. 1 is an exploded perspective view of a ratchet wrench in accordance with the preferred embodiment of the present invention.

Referring to the drawings and initially to FIGS. 1-8, a ratchet wrench in accordance with the preferred embodiment of the present invention comprises a wrench body 10, a ratchet wheel 20, a mounting member 30, a pawl member 40, an elastic member 50, and a first snap ring 60.

The wrench body 10 is provided with a first receiving recess 11 which has a circular shape and penetrates the wrench body 10. The wrench body 10 is provided with a second receiving recess 12 beside the first receiving recess 11. The second receiving recess 12 is connected to the first receiving recess 11. The second receiving recess 12 has a center disposed in the first receiving recess 11 and has a diameter less than that of the first receiving recess 11. The second receiving recess 12 penetrates the wrench body 10. The wrench body 10 is provided with a first resting face 13 and a second resting face 14. The first resting face 13 has a planar shape. The second resting face 14 has a planar shape. The first receiving recess 11 has a first arcuate face 15. The first arcuate face 15 is an internal arcuate face with a single diameter. The second receiving recess 12 has a second arcuate face 16. The second arcuate face 16 is an internal arcuate face with a single diameter.

The ratchet wheel 20 is pivotally mounted in the first receiving recess 11 and has a periphery provided with a ratchet (or toothed) portion 21 having an annular shape. The ratchet wheel 20 has a center provided with a mounting portion 22. The mounting portion 22 is a polygonal hole or a protruding square head. The ratchet wheel 20 has a first end provided with a first pivot portion 23 pivotally mounted in the first receiving recess 11. The first pivot portion 23 has a diameter approximately equal to that of the ratchet portion 21. The first pivot portion 23 is provided with a first annular groove 24 directed toward the second resting face 14. The ratchet wheel 20 has a second end provided with a second pivot portion 25 pivotally mounted in the first receiving recess 11. The ratchet portion 21 is disposed between the first pivot portion 23 and the second pivot portion 25. The second pivot portion 25 has a diameter equal to that of the first pivot portion 23 and approximately equal to that of the ratchet portion 21. The first pivot portion 23 and the second pivot portion 25 are arranged symmetrically relative to the ratchet portion 21. The ratchet wheel 20 is provided with a protruding rotation portion 26 having a maximum diameter. The rotation portion 26 abuts the first resting face 13.

The mounting member 30 is received in the second receiving recess 12. The mounting member 30 is loosely fitted in the second receiving recess 12. The mounting member 30 is provided with a receiving portion 31. The receiving portion 31 has an upper end provided with a first restriction section 32 and a lower end provided with a second restriction section 33. Each of the first restriction section 32 and the second restriction section 33 has a cross-sectional shape the same as that of the second receiving recess 12. The first restriction section 32 has an end face flush with the first resting face 13. The second restriction section 33 has an end face flush with the second resting face 14. The receiving portion 31 is provided with a first spring biased section 34. Preferably, the first spring biased section 34 is a groove or a column. The mounting member 30 has a front side provided with a third arcuate face 35. The third arcuate face 35 and the first arcuate face 15 have a same axis and a same diameter. The mounting member 30 has a rear side provided with a fourth arcuate face 36. The fourth arcuate face 36 and the second arcuate face 16 have a same axis and a same diameter.

The pawl member 40 has a rear side abutting the second arcuate face 16. The pawl member 40 is movably mounted in the receiving portion 31. The pawl member 40 is limited by the first restriction section 32 and the second restriction section 33, so that the pawl member 40 is not detached from the receiving portion 31 and the second receiving recess 12. The pawl member 40 has a front side provided with an engaging portion 41 engaging or meshing with the ratchet portion 21. The pawl member 40 is provided with a second spring biased section 42 aligning with the first spring biased section 34. Preferably, the second spring biased section 42 is a column or a circular groove.

The elastic member 50 is received in the receiving portion 31. The elastic member 50 is elastically biased between the mounting member 30 and the pawl member 40. The elastic member 50 pushes the pawl member 40 so that the engaging portion 41 meshes with the ratchet portion 21. The elastic member 50 has a first end abutting the first spring biased section 34 and a second end abutting the second spring biased section 42. Preferably, the elastic member 50 is a spring.

The first snap ring 60 is snapped into the first annular groove 24. Preferably, the first snap ring 60 has a C-shaped profile. The first snap ring 60 is elastically expandable outward. The first snap ring 60 is rotatable in concert with the ratchet wheel 20. The first snap ring 60 has an opening with a width less than that of the second receiving recess 12.

The rotation portion 26 rests on the first resting face 13, and the first snap ring 60 rests on the second resting face 14, so that the ratchet wheel 20 is limited by the rotation portion 26 and the first snap ring 60 and is pivotally mounted in the first receiving recess 11. The mounting member 30 and the pawl member 40 are limited by the rotation portion 26 and the first snap ring 60 and are not detached from the second receiving recess 12. Thus, the rotation portion 26 and the first snap ring 60 restrict the ratchet wheel 20, the mounting member 30, and the pawl member 40, to prevent the ratchet wheel 20, the mounting member 30, and the pawl member 40 from being detached from the wrench body 10.

Figure 2:
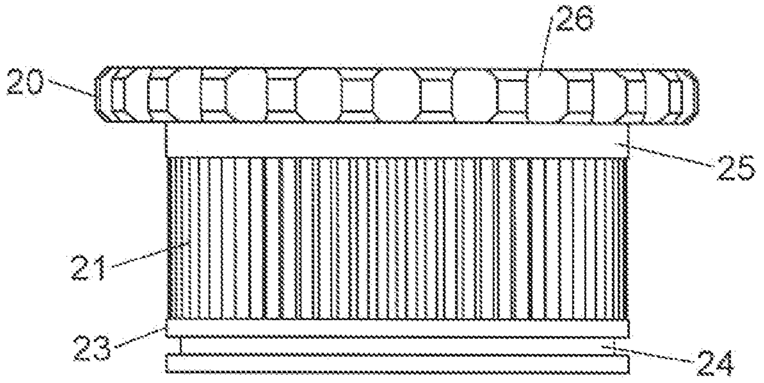
FIG. 2 is a front view of a ratchet wheel of the ratchet wrench in accordance with the preferred embodiment of the present invention.
Figure 3:
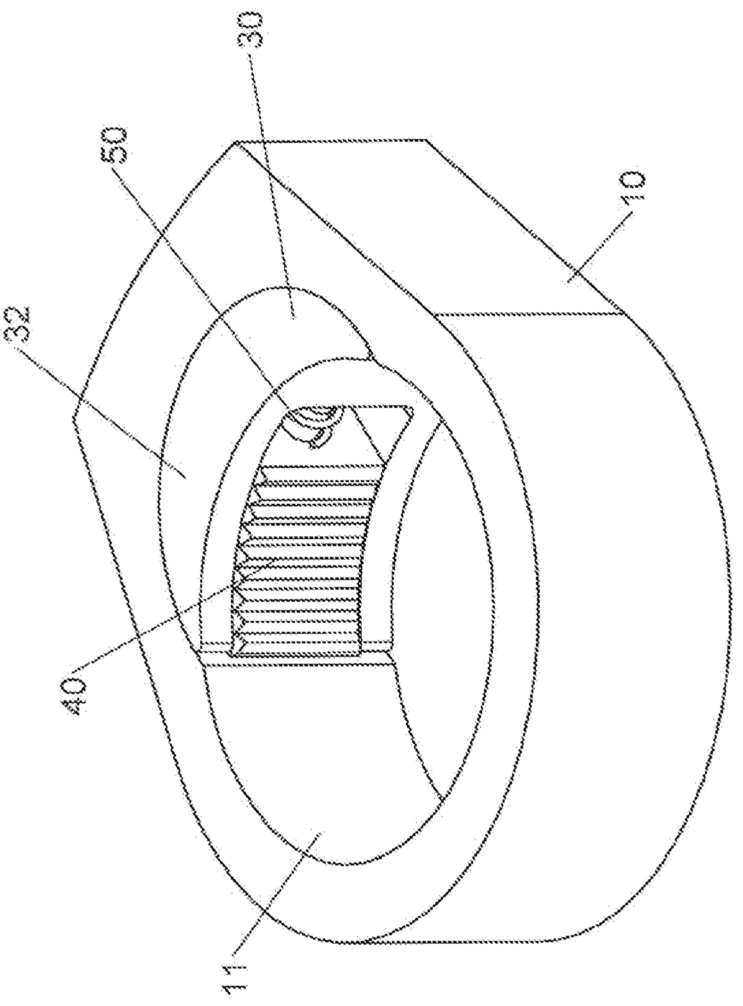
FIG. 3 is a partial perspective view of the ratchet wrench in accordance with the preferred embodiment of the present invention.
Figure 4:
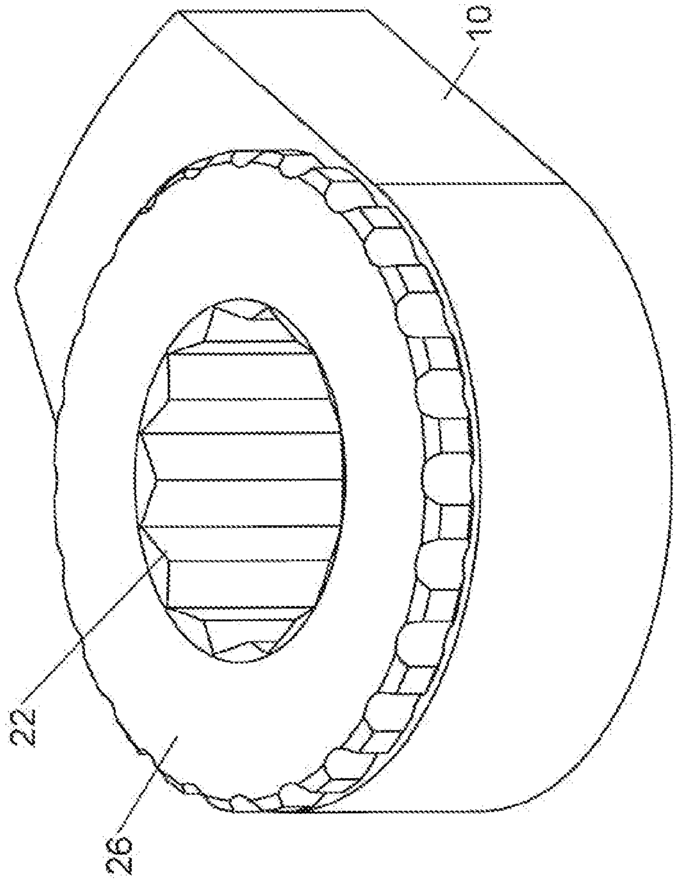
FIG. 4 is a perspective view of the ratchet wrench in accordance with the preferred embodiment of the present invention.
Figure 6:
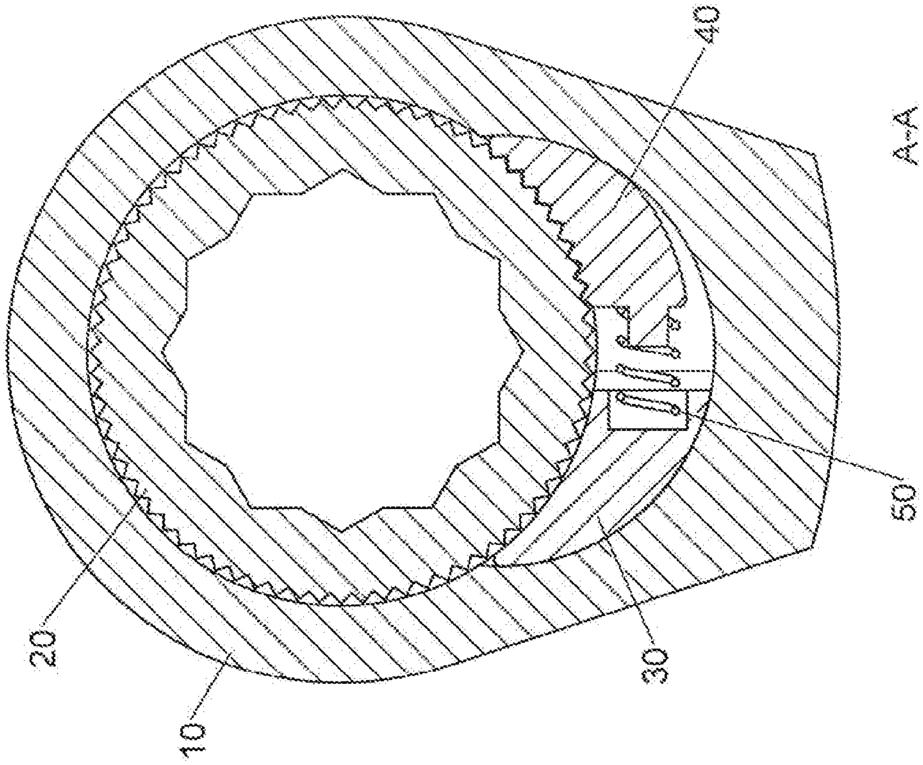
FIG. 6 is a cross-sectional view of the ratchet wrench taken along line A-A as shown in FIG. 5.
Figure 5:
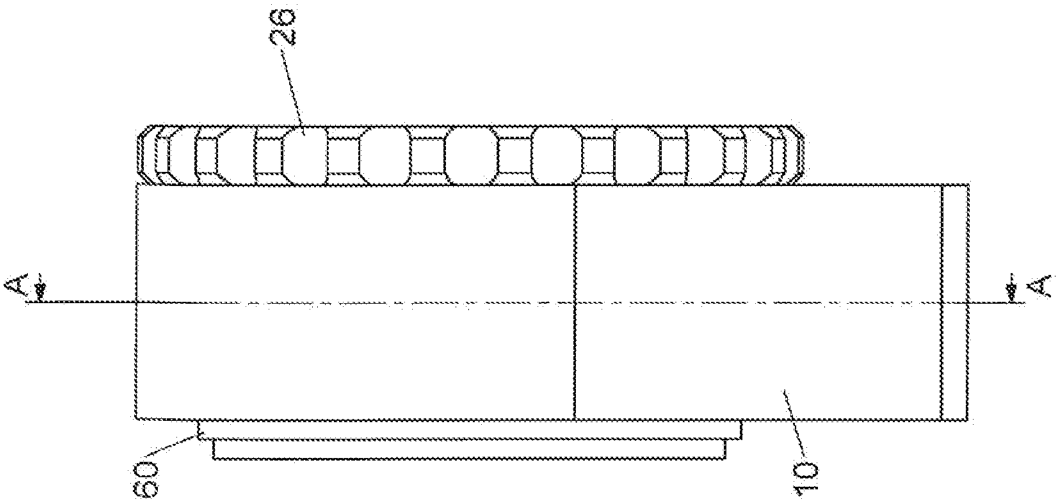
FIG. 5 is a side view of the ratchet wrench in accordance with the preferred embodiment of the present invention.

Referring to FIGS. 4-6 with reference to FIGS. 1-3, the ratchet wheel 20 is pivotally mounted in the first receiving recess 11, the mounting member 30 is received in the second receiving recess 12, the pawl member 40 is received in the receiving portion 31, the elastic member 50 is received in the receiving portion 31 and elastically biased between the mounting member 30 and the pawl member 40, and the first snap ring 60 is snapped into the first annular groove 24.

Figure 8:
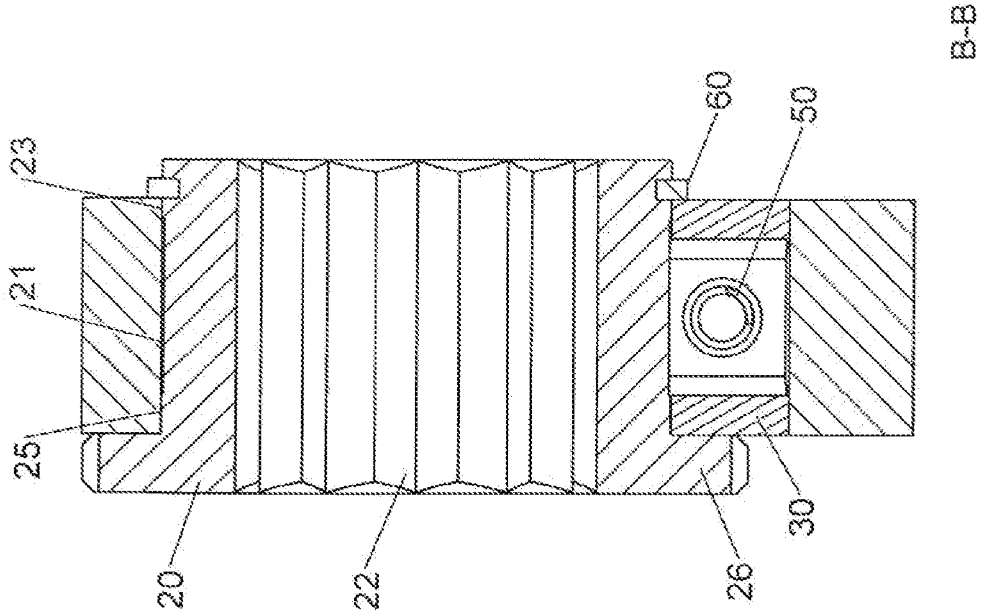
FIG. 8 is a cross-sectional view of the ratchet wrench taken along line B-B as shown in FIG. 7.
Figure 7:
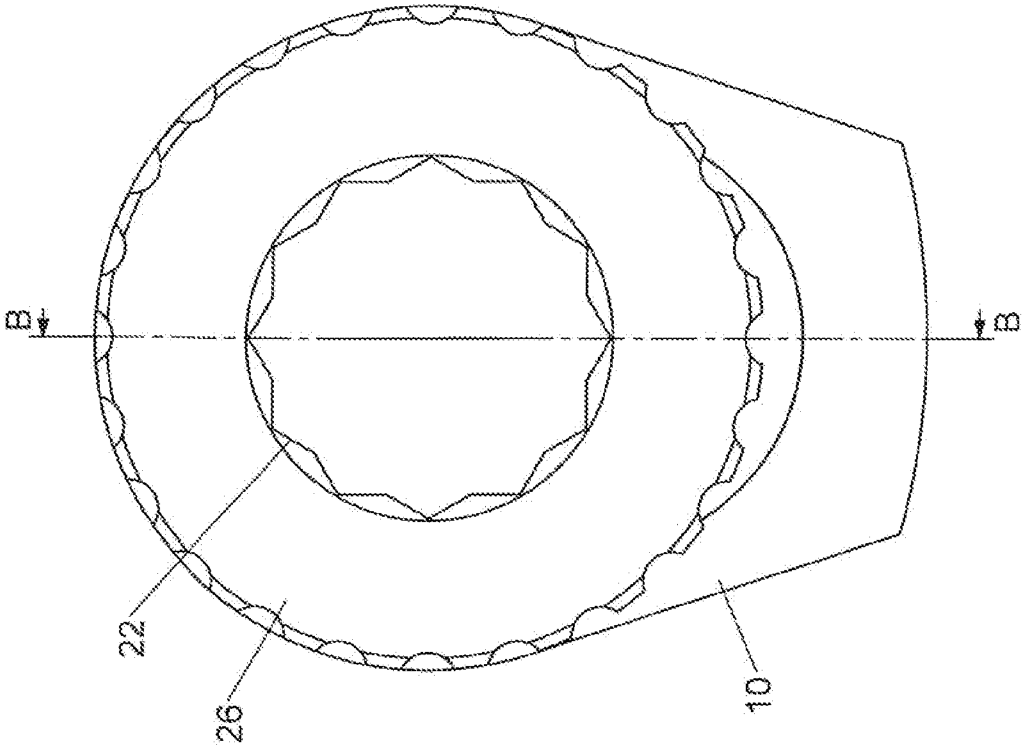
FIG. 7 is a top view of the ratchet wrench in accordance with the preferred embodiment of the present invention.

Referring to FIGS. 7 and 8 with reference to FIGS. 1-6, the ratchet wheel 20 is pivotally mounted in the first receiving recess 11, the rotation portion 26 rests on the first resting face 13, and the first snap ring 60 is snapped into the first annular groove 24. The first snap ring 60 restricts the ratchet wheel 20 to prevent the ratchet wheel 20 from being detached from the wrench body 10. The first snap ring 60 restricts the mounting member 30 and the pawl member 40 to prevent the mounting member 30 and the pawl member 40 from being detached from the wrench body 10.

Figure 9:
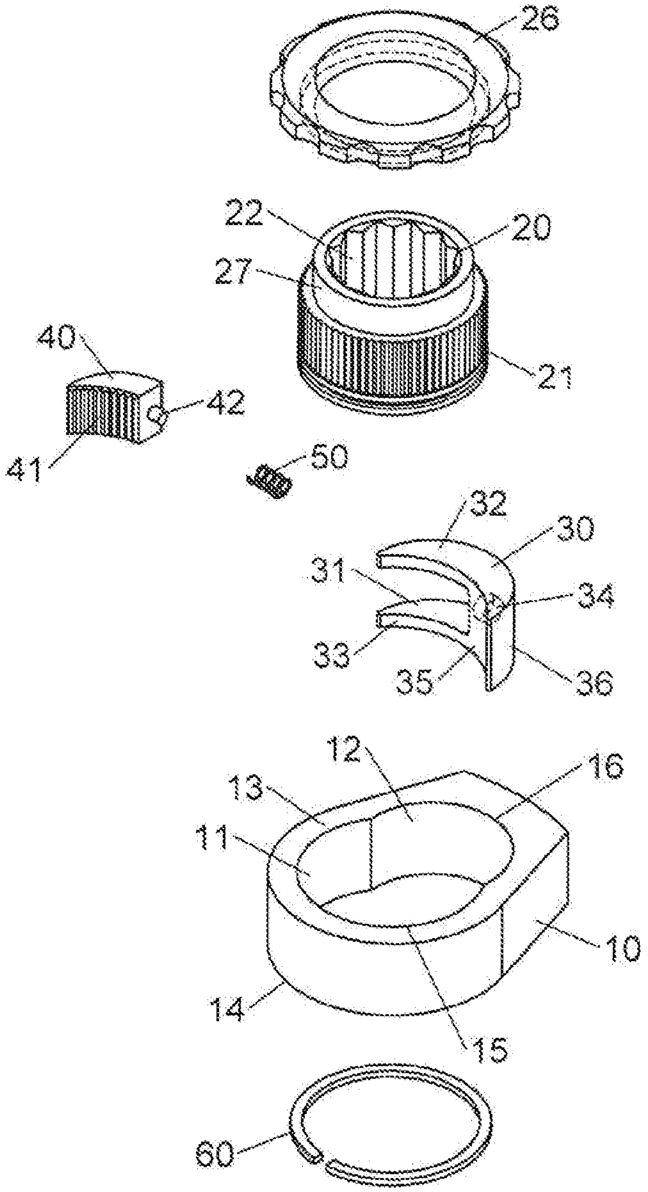
FIG. 9 is an exploded perspective view of a ratchet wrench in accordance with the second preferred embodiment of the present invention.
Figure 10:
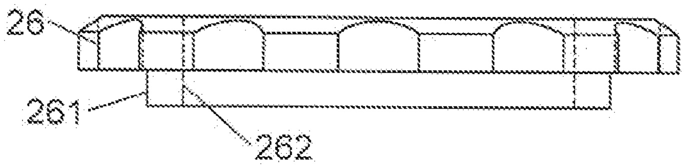
FIG. 10 is a front view of a rotation portion of the ratchet wrench in accordance with the second preferred embodiment of the present invention.
Figure 11:
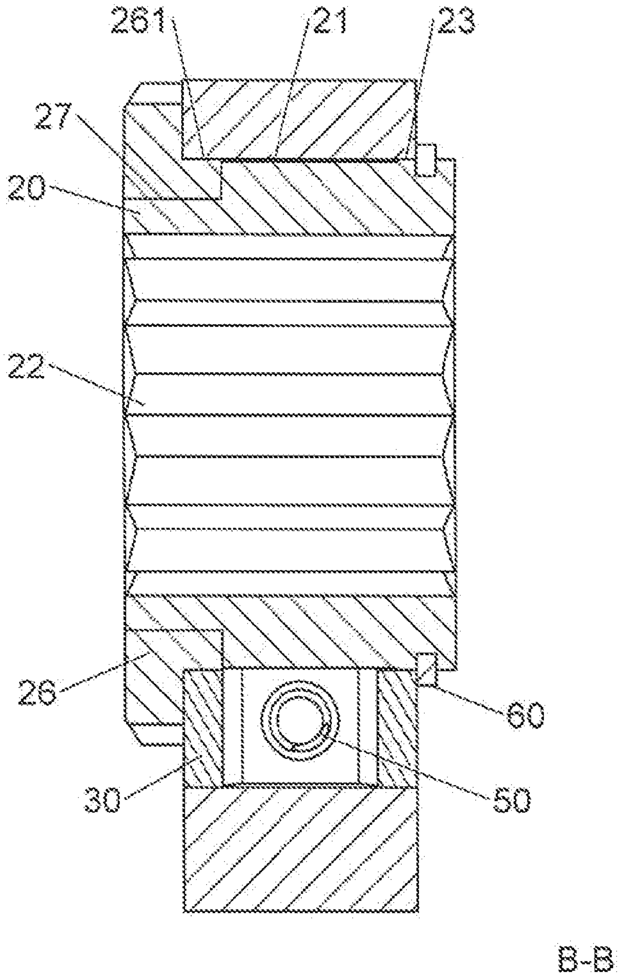
FIG. 11 is a cross-sectional view of the ratchet wrench in accordance with the second preferred embodiment of the present invention.

Referring to FIGS. 9-11 with reference to FIGS. 1-8, the rotation portion 26 is a single part. The rotation portion 26 is provided with a third pivot portion 261 pivotally mounted in the first receiving recess 11. The rotation portion 26 has an inner peripheral face provided with a first fitting section 262. The ratchet wheel 20 has an outer peripheral face provided with a second fitting section 27 fitted with the first fitting section 262, so that the rotation portion 26 is secured with the ratchet wheel 20 and rotated in concert with the ratchet wheel 20.

Preferably, the second fitting section 27 is closely fitted with the first fitting section 262. Alternatively, the second fitting section 27 is provided with an adhesive so that the first fitting section 262 is stuck to the second fitting section 27.

Figure 12:
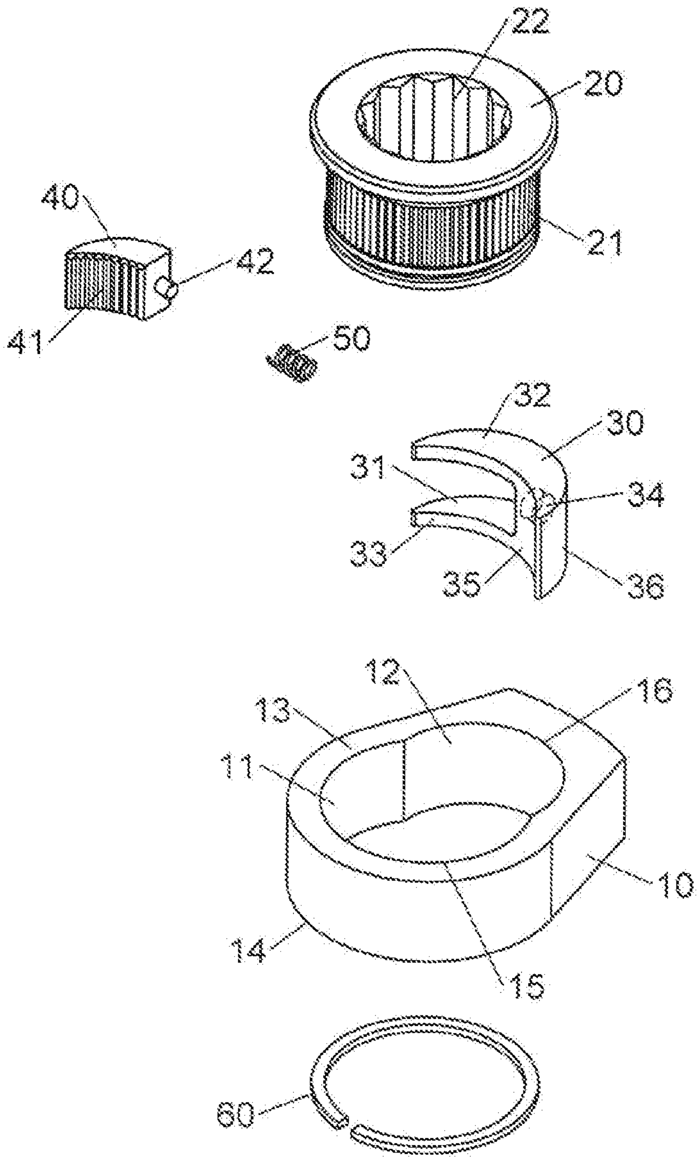
FIG. 12 is an exploded perspective view of a ratchet wrench in accordance with the third preferred embodiment of the present invention.
Figure 13:
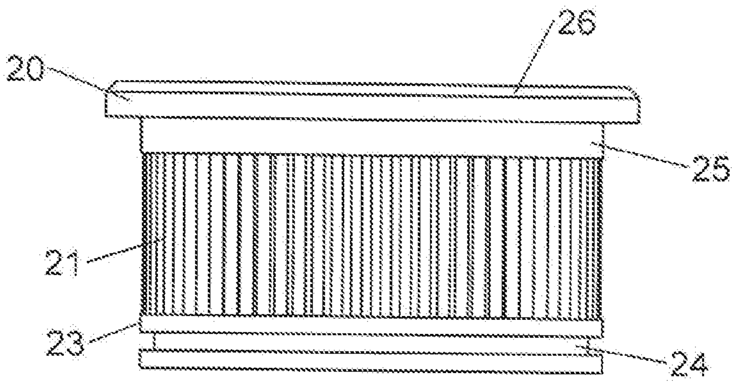
FIG. 13 is a front view of a ratchet wheel of the ratchet wrench in accordance with the third preferred embodiment of the present invention.

Referring to FIGS. 12 and 13 with reference to FIGS. 1 and 2, the first pivot portion 23 has a diameter more than that of the ratchet portion 21. The second pivot portion 25 has a diameter more than that of the ratchet portion 21. The rotation portion 26 has a diameter more than that of the second pivot portion 25. Preferably, the rotation portion 26 has a ring shape.

Accordingly, the ratchet wrench of the present invention has the following advantages.

1. With reference to FIG. 8, the rotation portion 26 rests on the first resting face 13, and the first snap ring 60 rests on the second resting face 14 and is retained in the first annular groove 24, so that the ratchet wheel 20, the mounting member 30, the pawl member 40, and the elastic member 50 are received in the wrench body 10, to finish assembly of the ratchet wrench. Thus, the first snap ring 60 facilitates assembly of the ratchet wrench.
2. The rotation portion 26 rests on the first resting face 13, and the first snap ring 60 rests on the second resting face 14, so that the ratchet wheel 20 is limited by the rotation portion 26 and the first snap ring 60 and is pivotally mounted in the first receiving recess 11. The mounting member 30 and the pawl member 40 are limited by the rotation portion 26 and the first snap ring 60 and will not be detached from the second receiving recess 12. Thus, the rotation portion 26 and the first snap ring 60 restrict the ratchet wheel 20, the mounting member 30, the pawl member 40, and the elastic member 50, to prevent the ratchet wheel 20, the mounting member 30, the pawl member 40, and the elastic member 50 from being detached from the wrench body 10.
3. The mounting member 30 has a volume almost equal to that of the second receiving recess 12, so that the mounting member 30 directly closes and seals the second receiving recess 12, without having to additionally add other part for closing the second receiving recess 12, thereby saving the cost of fabrication.
4. The ratchet wrench only contains the wrench body 10, the ratchet wheel 20, the mounting member 30, the pawl member 40, and the elastic member 50, so that the ratchet wrench has a simplified construction with fewer parts and a lower cost.
5. In assembly, the mounting member 30, the pawl member 40, and the elastic member 50 are assembled and placed into the second receiving recess 12. Then, the ratchet wheel 20 is mounted in the first receiving recess 11. Finally, the first snap ring 60 is mounted on the wrench body 10. Thus, the ratchet wrench is assembled easily and rapidly.
6. The first receiving recess 11 penetrates the wrench body 10, and the second receiving recess 12 also penetrates the wrench body 10. Thus, when the cutting tool is used to work the first receiving recess 11 and the second receiving recess 12, it is unnecessary to control the working depth of the cutting tool, thereby facilitating the efficiency for working the wrench body 10.
7. The first receiving recess 11 and the second receiving recess 12 are worked and molded by drills. The first receiving recess 11 and the second receiving recess 12 are worked by the same machine. Thus, the tolerance will not be accumulated.
8. Each of the first receiving recess 11 and the second receiving recess 12 has two open ends. The wrench body 10 is initially molded by forging, and then molded on a die by a secondary stamping, to completely form the first receiving recess 11, the second receiving recess 12, the first resting face 13, the second resting face 14, the first arcuate face 15, and the second arcuate face 16.
9. The operator selects the drill working or the stamping according to a quality requirement of the first receiving recess 11 and the second receiving recess 12, so that the wrench body 10 has multiple working options.
10. The first snap ring 60 rests on the second resting face 14. Thus, the operator only needs to release the first snap ring 60 to remove the ratchet wheel 20, the mounting member 30, the pawl member 40, and the elastic member 50 from the wrench body 10 for replacement of parts. Thus, the ratchet wrench facilitates repair and maintenance, and the parts of the ratchet wrench are replaced quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ratchet wrench comprising:

a wrench body, a ratchet wheel, a mounting member, a pawl member, an elastic member, and a first snap ring; wherein:

the wrench body is provided with a first receiving recess which has a circular shape and penetrates the wrench body;

the wrench body is provided with a second receiving recess beside the first receiving recess;

the second receiving recess is connected to the first receiving recess;

the second receiving recess has a center disposed in the first receiving recess and has a diameter less than that of the first receiving recess;

the second receiving recess penetrates the wrench body;
the wrench body is provided with a first resting face and a second resting face;
the first resting face has a planar shape;
the second resting face has a planar shape;
the first receiving recess has a first arcuate face;
the first arcuate face is an internal arcuate face with a single diameter;
the second receiving recess has a second arcuate face;
the second arcuate face is an internal arcuate face with a single diameter;
the ratchet wheel is pivotally mounted in the first receiving recess and has a periphery provided with a ratchet portion having an annular shape;
the ratchet wheel has a center provided with a mounting portion;
the ratchet wheel has a first end provided with a first pivot portion pivotally mounted in the first receiving recess;
the first pivot portion is provided with a first annular groove directed toward the second resting face;
the ratchet wheel has a second end provided with a second pivot portion pivotally mounted in the first receiving recess;
the ratchet portion is disposed between the first pivot portion and the second pivot portion;
the ratchet wheel is provided with a protruding rotation portion having a maximum diameter;
the rotation portion abuts the first resting face;
the mounting member is received in the second receiving recess;
the mounting member is provided with a receiving portion;
the receiving portion has an upper end provided with a first restriction section and a lower end provided with a second restriction section;
each of the first restriction section and the second restriction section has a cross-sectional shape the same as that of the second receiving recess;
the first restriction section has an end face flush with the first resting face;
the second restriction section has an end face flush with the second resting face;
the receiving portion is provided with a first spring biased section;
the mounting member has a front side provided with a third arcuate face;
the third arcuate face and the first arcuate face have a same axis and a same diameter;
the mounting member has a rear side provided with a fourth arcuate face;
the fourth arcuate face and the second arcuate face have a same axis and a same diameter;
the pawl member has a rear side abutting the second arcuate face;
the pawl member is movably mounted in the receiving portion;
the pawl member is limited by the first restriction section and the second restriction section, so that the pawl member is not detached from the receiving portion and the second receiving recess;
the pawl member has a front side provided with an engaging portion meshing with the ratchet portion;
the pawl member is provided with a second spring biased section aligning with the first spring biased section;
the elastic member is received in the receiving portion;
the elastic member is elastically biased between the mounting member and the pawl member;
the elastic member pushes the pawl member so that the engaging portion meshes with the ratchet portion;
the elastic member has a first end abutting the first spring biased section and a second end abutting the second spring biased section;
the first snap ring is snapped into the first annular groove;
the first snap ring has a C-shaped profile;
the first snap ring is elastically expandable outward;
the first snap ring is rotatable in concert with the ratchet wheel;
the rotation portion rests on the first resting face, and the first snap ring rests on the second resting face, so that the ratchet wheel is limited by the rotation portion and the first snap ring;
the mounting member and the pawl member are limited by the rotation portion and the first snap ring and are not detached from the second receiving recess; and
the rotation portion and the first snap ring restrict the ratchet wheel, the mounting member, and the pawl member, to prevent the ratchet wheel, the mounting member, and the pawl member from being detached from the wrench body.

2. The ratchet wrench as claimed in claim 1, wherein the mounting portion is a polygonal hole.

3. The ratchet wrench as claimed in claim 1, wherein the mounting member is loosely fitted in the second receiving recess.

4. The ratchet wrench as claimed in claim 1, wherein the first spring biased section is a groove, and the second spring biased section is a column.

5. The ratchet wrench as claimed in claim 1, wherein:
the rotation portion is a single part;
the rotation portion is provided with a third pivot portion pivotally mounted in the first receiving recess;
the rotation portion has an inner peripheral face provided with a first fitting section; and
the ratchet wheel has an outer peripheral face provided with a second fitting section fitted with the first fitting section, so that the rotation portion is secured with the ratchet wheel and rotated in concert with the ratchet wheel.

6. The ratchet wrench as claimed in claim 5, wherein:
the second fitting section is closely fitted with the first fitting section; or
the second fitting section is provided with an adhesive so that the first fitting section is stuck to the second fitting section.

7. The ratchet wrench as claimed in claim 1, wherein:
the first pivot portion has a diameter more than that of the ratchet portion;
the second pivot portion has a diameter more than that of the ratchet portion;
the rotation portion has a diameter more than that of the second pivot portion; and
the rotation portion has a ring shape.

8. The ratchet wrench as claimed in claim 1, wherein the first receiving recess has an open top and an open bottom, and the second receiving recess has an open top and an open bottom.

9. The ratchet wrench as claimed in claim 1, wherein the first pivot portion partially protrudes from the second resting face of the wrench body, the first annular groove of the first pivot portion protrudes from the second resting face of the wrench body, and the first snap ring protrudes from the second resting face of the wrench body.

10. The ratchet wrench as claimed in claim 1, wherein the first pivot portion has a diameter equal to that of the ratchet portion, and the second pivot portion has a diameter equal to that of the ratchet portion.

11. The ratchet wrench as claimed in claim 8, wherein the mounting member seals the open top and the open bottom of the second receiving recess.

12. The ratchet wrench as claimed in claim 1, wherein the receiving portion of the mounting member has a U-shaped profile.

13. The ratchet wrench as claimed in claim 1, wherein the first spring biased section is disposed between the first restriction section and the second restriction section.

14. The ratchet wrench as claimed in claim 1, wherein the first spring biased section is connected to the receiving portion.

15. The ratchet wrench as claimed in claim 1, wherein the pawl member is fully received in the receiving portion.

16. The ratchet wrench as claimed in claim 1, wherein the pawl member and the elastic member are fully disposed between and limited by the first restriction section and the second restriction section.

17. The ratchet wrench as claimed in claim 1, wherein the first snap ring rests on the mounting member.

* * * * *